United States Patent [19]
Thorp et al.

[11] Patent Number: 5,501,802
[45] Date of Patent: Mar. 26, 1996

[54] METHOD FOR TREATING WATER USING AN ORGANIC SANITIZER AND A PERSULFATE

[75] Inventors: Dean S. Thorp, Levittown, Pa.; Frank E. Caropreso, Skillman, N.J.; Robert H. Tieckelmann, Trenton, N.J.; Donald Lapham, III, Plainsboro, N.J.

[73] Assignee: FMC Corporation, Philadelphia, Pa.

[21] Appl. No.: 311,834

[22] Filed: Sep. 23, 1994

Related U.S. Application Data

[63] Continuation of Ser. No. 51,488, Apr. 22, 1993, abandoned.

[51] Int. Cl.$^6$ .................................................. C02F 1/50
[52] U.S. Cl. ............................................. 210/758; 210/764
[58] Field of Search ........................... 210/764, 758, 210/765, 766, 912; 252/180, 181

[56] References Cited

U.S. PATENT DOCUMENTS

| | | | |
|---|---|---|---|
| 3,232,869 | 2/1966 | Gard | 210/62 |
| 3,690,860 | 9/1972 | Salutsky et al. | 210/764 |
| 4,253,971 | 3/1981 | MacLeod et al. | 210/764 |
| 4,492,618 | 1/1985 | Eder | 210/764 |
| 4,737,507 | 4/1988 | Turner et al. | 514/360 |
| 4,780,216 | 10/1988 | Wojtowicz | 210/764 |
| 4,804,480 | 2/1989 | Jayawant | 210/759 |
| 5,098,582 | 3/1992 | Antelman | 210/764 |
| 5,223,149 | 6/1993 | Antelman | 210/764 |

FOREIGN PATENT DOCUMENTS 808785  8/1974  Belgium.

*Primary Examiner*—Thomas Wyse
*Attorney, Agent, or Firm*—Anthony L. Cupoli; Patrick C. Baker; Robert L. Andersen

[57] ABSTRACT

Persulfates are used to provide water clarity when organic sanitizers such as biguanides are utilized for sanitizing recreational waters. Persulfate applications of 2 ppm or more can be used. Additionally, maintenance applications of the persulfate or the bisulfate can be used.

8 Claims, No Drawings

METHOD FOR TREATING WATER USING AN ORGANIC SANITIZER AND A PERSULFATE

This application is a continuation of application Ser. No. 08/051,488, filed Apr. 22, 1993, now abandoned.

FIELD OF THE INVENTION

The invention is in the field of water treatment. More particularly, it is in the field of providing clear and microbially safe recreational water.

BACKGROUND OF THE INVENTION

In maintaining water systems for recreational use a number of parameters have to be controlled. These factors include pH, alkalinity, and calcium concentration. Generally, a pH of 7.2–7.8, alkalinity within the range of 85–170 ppm, and calcium or magnesium hardness within the range of 140 to 250 ppm is desired for recreational waters.

In addition to the above it is important to provide clear and microbially safe water. Chlorine and other halogen based sanitization systems or products actually perform two tasks which are important to the upkeep of swimming pool and bathing waters.

The first task, sanitization, involves the biocidal or microbiocidal treatment of the pool water. Chlorine is a good sanitizer because it can penetrate the cell wall of microbiological agents and then destroy them.

The second task, involves providing water clarity by oxidizing dissolved or suspended matter in the water which can provide a nutrient source for pathogens. The unwanted matter include suntan oils, urea, leaves, soil and other matter introduced by the bathers or the wind.

Historically, chlorine has been successfully used as a treatment for both sanitization and as a water clarity agent because it is both a powerful biocide and oxidizing agent. However, the use of chlorine has fallen into disfavor because of environmental issues.

As an alternative to chlorine, quaternary ammonium compounds, such as the biguanides, and particularly the polyhexamethylene biguanides have become widely used as sanitizers for swimming pool water and other recreational water. Although these organic compounds are good microbiocides, they are not able to oxidize matter as required to provide water clarity. A 27.5% hydrogen peroxide has been used for that purpose because, like chlorine, it has the ability to oxidize organic compounds to forms which are more readily removed from the water. Hydrogen peroxide is also used because it is a powerful oxidizing agent. It is such a powerful oxidizing agent that this liquid can initiate combustion and cause burns to skin and eyes. However, it is not substantially reactive with the biguanides, which are oxidizable organic compounds.

In fact the biguanides are readily removed from pool water by oxidizing them with Oxone® peroxygen, $2KHSO_5 \cdot K_2SO_4 \cdot KHSO_4$, which is commonly used as an oxidizer to destroy biguanide in biguanide sanitized pools prior to instituting chlorine sanitization. Oxone provides about 4.5% active oxygen for this purpose. The active ingredient in Oxone is potassium monopersulfate, also known as potassium caroate, $KHSO_5$. Oxone is a registered trademark of DuPont.

The persulfates have been used as oxidants for providing water clarity in conjunction with inorganic sanitizers such as chlorine, bromine, and chloro and bromo isocyanurates, but have not been used as an oxidant used in conjunction with organic sanitizers because of their similarity to the active ingredient of Oxone (potassium caroate), which is known to substantially oxidize organic sanitizers.

SUMMARY OF THE INVENTION

We have discovered that despite its chemical similarity to the monopersulfates, sodium persulfate, $Na_2S_2O_8$, can be substituted for hydrogen peroxide as an oxidizer suitable for restoring or maintaining clarity to recreational waters when organic sanitizers are used. More particularly, persulfate can be used with and is substantially non-reactive with biguanides including polyhexamethylene biguanide. Thus, water can be treated with the simultaneous or sequential addition of a biguanide and a persulfate to sanitize and clarify the water. As an additional benefit, such use of persulfate aids in the pH control of the water.

DESCRIPTION OF THE PREFERRED EMBODIMENTS

Swimming pool and other recreational water can be treated using a sanitizer for biocidal control, and an oxidizer for converting dissolved or suspended matter to removable forms. Where an organic sanitizer such as biguanide is used, it is normally used at a dosage of 30 ppm or more, although concentrations within the range of from 20 to 60 ppm are acceptable. Persulfate is a suitable oxidizer which acts as a water clarity agent. It can be applied to water at a rate of 1 to 30 ppm. However, an application of 2 to 9 ppm is generally preferred. In either, the effective amount of sanitizer or water clarity agent depends on the condition of the water being treated, and can be less than or greater than the figures given. The most effective dosage or application can be determined empirically using tests available and known to those of ordinary skill in the art.

Ammonium, potassium, and sodium persulfate have been found to be effective as oxidizers for water clarification when used alone or in combination, however, the sodium salt is preferred. These salts can be used alone or as part of a formulation. The amount of persulfate salt required depends on the amount of active oxygen that is needed for establishing or maintaining swimming pool water clarity and is usually determined empirically by the person maintaining the pool, since the requirements vary with the concentration and nature of the pollutants being removed.

ClearAdvantage® peroxygen, a formulation containing sodium persulfate, plus inerts is suitable as a source of persulfate for use with biguanide. ClearAdvantage is a trademark of FMC corporation.

As discussed above, sodium persulfate provides an acceptable level of treatment; however, higher application rates may be appropriate for the first application followed by lower subsequent application rates. The higher initial rate may be needed for a pool in which treatment is just being instituted because high demands for oxidizer on startup is not unusual. As pool treatment progresses the demand generally is reduced and a steady state of organic contaminant and oxidizer consumption can be approximated.

A maintenance concentration of persulfate within the range of from 2 to 9 ppm are optimal, while concentrations of up to 30 ppm persulfate provides a satisfactory water clarity and is suitable as a maintenance level of persulfate.

The persulfate dosage form can contain from 5% to 100% persulfate. More preferred are dosage forms which contain from 50 to 80% persulfate, and most preferred are dosage forms which contain from 60 to 80% persulfate. A formulation containing 75% sodium or potassium persulfate and 25% inert ingredients provides sufficient active oxygen for oxidizing the matter in the pool.

The other ingredient(s) which may be included in the water clarifying formulation can be a flow enhancer or stabilizer for the persulfate. Persulfate is best presented as a formulation containing adjuncts for improved flowability, for anti-caking, and for pH adjustment. In addition, adjuncts such as sodium sulfate can be added which inhibit the autoignition of the persulfate, making it safer for storage and transport.

The "other ingredients" may be comprised of a number of inorganic and organic water soluble species, alone or in combination that are compatible with persulfate salts to present a dry or substantially dry formulation.

The "other ingredients" can include the sodium, potassium, or ammonium sulfates or bisulfates, as well as the other soluble or weakly soluble sulfate or bisulfate salts. Also included are various forms of carbonate, bicarbonate, and sesquicarbonate. Sodium salts are preferred but other salts, where available, are suitable.

In order to obtain satisfactory sanitization and water clarification the chemical balance of the water must be established. The primary factors which are addressed for this purpose are pH, alkalinity, and hardness. The pH is generally kept within the range of from 7.2 to 8.0. Alkalinity is generally kept within the range of from 80 to 130 ppm, and hardness is generally kept within the range of from 150 to 250 ppm. However optimal values for are generally found within the range of from 7.2 to 7.6, of from 100 to 120 ppm, and of from 160 to 200 ppm for pH, alkalinity, and hardness respectively. Not all of these factors must be adjusted in every water.

Suitable ingredients for adjusting pH include sodium hydroxide or sodium carbonate for increasing pH, and sodium bisulfate or hydrochloric acid for decreasing pH. Other ingredients known to those skilled in the art of pool maintenance can also be used.

Suitable ingredients for adjusting alkalinity include sodium bicarbonate, sodium sesquicarbonate and other alkalinity adjusters known to those of ordinary skill in the art of pool maintenance.

Suitable ingredients for adjusting calcium or magnesium hardness include soluble calcium or magnesium salts such as calcium chloride, magnesium chloride, calcium carbonate, magnesium carbonate, and the like.

In addition to the above, ingredients can be added to the water for controlling other factors, such as color, algae growth, pool liner staining, and foaming and other problems which are known in the industry. Those factors can be controlled using chemicals and or techniques known to those of ordinary skill in the art of pool maintenance. These ingredients may include but are not limited to polymers, antifoams, algaecides, chelating agents, sequestering agents, and the like.

In addition to the above, chelating agents which tie up metal cations can improve the efficacy of the treatment, since such cations can catalyze oxidation reactions and lead to excessive use of oxidizing agent. Tetra sodium ethylenediaminetetraacetate hydrate, edta, and other agents known to those of ordinary skill in the art can be used.

Moreover, antichlors, such as sodium thiosulfate can be used for eliminating chlorine from the water in a pool if the water supply to that pool has been chlorinated.

The following examples further illustrate the invention without limiting the scope thereof.

EXAMPLES 1–3

A Comparison of Oxidizing Agents

This study was conducted with four 70 gallon simulated pools maintained per the methods described herein. Teel Water Filter Cartridges (Model 1P753-A) and Little Giant pumps (Catalog No. 501003) were used to recirculate pool water every six hours.

Pool water was adjusted with sodium bicarbonate to achieve an alkalinity of 120 ppm and calcium chloride to achieve a calcium hardness of 160 ppm. Each pool was preconditioned with Baqua Start™ reducing agent (sodium thiosulfate) and Baq Out™ chelating agent (tetra sodium ethylenediaminetetraacetate hydrate). Baqua Start™ eliminates residual chlorine from the tap water used to fill the pools. Baq Out™ is a chelating agent for metals. Baquacil™biguanide was used in the experiments below as the sanitizer. Bacquacil is primarily a polyhexamethylene biguanide. Bacquacil, Baq Out, and Baqua Start are trademarks of ICI Americas.

Baquacil concentration, water turbidity, and pH were measured on a daily basis. Calcium hardness, alkalinity, and total dissolved solids (TDS) were measured on a weekly basis. The sodium persulfate and hydrogen peroxide content of each pool were measured daily for the last four weeks of the study.

Pool pH was determined with a Lovibond Photometer PC20. The PC20 measures the absorbance of solutions treated with phenol red. Baquacil concentrations were measured with the STC-F Colorimeter. The STC-F measures the absorbance of solutions treated with the Baqua Test III indicator solution.

Turbidity was measured with a Lamotte Turbidity Meter (Model 2008). NTU, the units for turbidity, are an acronym for Nephelometric Turbidity Unit. Nephelometry is the measurement of light scattering in the direction perpendicular to its propagation.

Calcium hardness and alkalinity were measured titrimetrically with a Taylor Technologies Test Kit. When required, chemical adjustments were made according to the Taylor Technologies Water Chemistry Testing and Treatment Guide. Sodium persulfate and hydrogen peroxide were measured colorimetrically with a CHEMetrics, Inc. test kit (Model K-7870).

The four simulated pools were established according to the methods outlined in G. P. Fitzgerald and L. Faust, Bioassay for Algicidal vs. Algistatic Chemicals, *Water and Sewerage Works*, 110, 296–298, 1963, as described above. Three simulated pools were maintained using polyhexamethylene biguanide as the sanitizer: and one pool was not treated. One pool, the untreated pool, was used as the control corresponded to the use of no sanitizer with no oxidizer. Another pool corresponded to the use of the sanitizer and no oxidizer. In a third pool sanitizer was used with a sodium persulfate water clarity agent. In a fourth pool sanitizer was used with hydrogen peroxide as the water clarity agent.

The data generated in Examples 1–3 are presented in Tables 1–3 respectively.

Biguanide was initially added and maintained at 50 ppm. To simulate the waste load from bathers a 1.5 ml dose of "bather load" was added to each pool daily (table 2). In addition, a single 2 ml portion of castor oil, to simulate bather oils, was added to each pool prior to addition of the oxidizer.

Table 2 provides the application profile for sanitizer and/or for the oxidizer corresponding to the data points presented in Table 1. A 27.5 weight percent hydrogen peroxide was used. To simulate bather load, a mixture of inorganic and organic compounds and inorganic salts was added five times each week, as indicated in Table 2. A single addition of castor oil was made to each pool to simulate oils contributed by bathers.

Several data sets were collected. The efficacy of either oxidizer was determined by measuring turbidity of the simulated pool water. Compatibility between sanitizer and oxidizer was determined through measurement of the sanitizer content of each pool and measurement of either sodium persulfate or hydrogen peroxide levels. Samples for determination of total organics were collected on Day 1 and Day 28 and subsequently analyzed.

During the course of the study, persulfate when used was applied to the simulated pool four times at a one pound per 10K gallon of pool water rate. The total application was equivalent to 36 ppm of sodium persulfate. For the pools in which hydrogen peroxide was used, the hydrogen peroxide was added once (Day 1) at a rate of one gallon per 10,000 gallon of pool water. The total application was equivalent to 30 ppm of hydrogen peroxide. Maintenance additions of sanitizer were made on Day 13 and Day 28. Each addition was about 15 ppm.

The Table 1 data establishes that persulfate and sanitizer when used together prevent the formation of turbid water and will provide a pleasing appearance to pool water. Thus, the clarity of recreation water, which is a major concern of pool owners, is provided for and maintained.

Compatibility of the swimming pool oxidizer and the sanitizer are important for several reasons. Compatibility ensures that oxidizer and sanitizer are used efficiently. More importantly, if the two products are compatible, the oxidizer will not catastrophically decompose the sanitizer and leave the pool water unprotected from bacteria introduced by normal pool use patterns. The Table 2 data establishes that each oxidizer product had an effect on the sanitizer that was most pronounced in the early portion of the treatment regimen. Subsequent additions of persulfate had little effect on the sanitizer. Clearly, neither 30 ppm of hydrogen peroxide nor 36 ppm sodium persulfate were detrimental to the overall sanitization of the simulated pools.

These results support the claim that persulfate can effectively establish and maintain pool clarity. It is noteworthy that the pools treated with either persulfate or hydrogen peroxide behaved similarly, each requiring two "maintenance" additions of sanitizer (a total of about 30 ppm); while, the pool containing biguanide, which was not clarified with an oxidizer, required no additional maintenance additions of sanitizer. This indicates that both hydrogen peroxide and persulfate do oxidize the biguanide, albeit in very small quantities. Overall, sodium persulfate reacted with about 10 ppm more sanitizer than did hydrogen peroxide.

Moreover, Table 3, directed to total organic carbon analysis, shows that sodium persulfate more effectively controlled the organic content of the pools, as determined by total organic carbon analyses, than did the hydrogen peroxide. In fact the data shows that with hydrogen peroxide the total organic content of the pool would have increased by 20% while a pool treated with sodium persulfate experienced a 24% decrease in total organic carbon. Thus, total organic carbon can be decreased using sodium persulfate depending on the system being treated. The decrease in total organic carbon represents those carbon containing compositions that were removed from the system either by filtration or by the atmosphere.

TABLE 1

Turbidity Results
Turbidity (NTU)

| Day | No Sanitizer No Oxidizer | Sanitizer No Oxidizer | Sanitizer Persulfate | Sanitizer H Peroxide |
|---|---|---|---|---|
| 1 | 0 | 0 | 0* | 0# |
| 2 | 0.06 | 0 | 0 | 0 |
| 5 | 0.35 | 0.2 | 0.02 | 0.06 |
| 6 | 0.21 | 0.1 | 0* | 0 |
| 7 | 0.26 | 0.05 | 0 | 0 |
| 9 | 0.35 | 0.05 | 0 | 0 |
| 13 | 0.53 | 0.05 | 0 | 0 |
| 14 | 0.5 | 0 | 0 | 0 |
| 15 | 0.57 | 0 | 0* | 0 |
| 17 | 0.59 | 0.05 | 0 | 0 |
| 19 | 0.66 | 0.03 | 0 | 0 |
| 20 | 0.65 | 0.05 | 0 | 0 |
| 21 | 0.7 | 0.09 | 0 | 0 |
| 23 | 0.8 | 0.12 | 0 | 0 |
| 26 | 0.58 | 0.1 | 0 | 0 |
| 28 | 0.6 | 0.13 | 0 | 0 |
| 29 | 0.63 | 0.15 | 0* | 0 |
| 34 | 0.53 | 0.1 | 0.02 | 0 |

27.5% aqueous hydrogen peroxide added
*Sodium persulfate added

Example 2

TABLE 2

Stability Results
Sanitizer Concentration (ppm)

| Day | Sanitizer No Oxidizer | Sanitizer Persulfate | Sanitizer $H_2O_2$ |
|---|---|---|---|
| 1 | 45 | 40* | 45# |
| 2 | 45 | 35 | 40 |
| 5 | 40 | 30 | 35 |
| 6 | 35 | 30* | 35 |
| 7 | 40 | 30 | 35 |
| 9 | 55 | 28 | 36 |
| 13 | 53 | 22$^B$ | 29$^B$ |
| 14 | 53 | 34 | 40 |
| 15 | 50 | 43* | 50 |
| 17 | 50 | 39 | 48 |
| 19 | 49 | 35 | 42 |
| 20 | 48 | 33 | 40 |
| 21 | 50 | 31 | 42 |
| 23 | 52 | 30 | 40 |
| 26 | 50 | 31 | 38 |
| 28 | 52 | 29$^B$ | 35$^B$ |
| 29 | 50 | 39* | 45 |
| 34 | 48 | 29 | 41 |

Baqua Shock Added
*ClearAdvantage Added
$^B$Maintenance Addition of Baquacil

Example 3

TABLE 3

| | Total Organic Carbon Analyses | | |
|---|---|---|---|
| Percent TOC Treatment | Initial[1] TOC (ppm) | Final[2] TOC (ppm) | % Increase |
| Untreated | 14 | 20 | 43[3]> |
| Baq/No Oxidizer | 12 | 24.5 | 104 |
| Baq/FMC Oxidizer | 17 | 13 | −24 |
| Baq/Baq Shock | 15 | 18 | 20 |

[1]Initial TOC = Total organic carbon
[2]Final TOC = Total organic carbon
[3]This may not be a true representation of TOC, because some organic matter collected on the bottom of the tank.

EXAMPLES 4–8

Eight Week Study

Using the apparatus and general procedure described in Example 1, an eight week study was conducted to explore the use of organic sanitizer with a persulfate. In this study four tables of data were collected, corresponding to data generated as and are presented as Tables 4–7 corresponding to Examples 4–8. For each of these Examples, sufficient chemical was added to provide the concentration indicated. In a pool 30 to 50 ppm of biguanide sanitizer was maintained to provide sufficient sanitizer for unexpected introduction of microorganisms.

In Table 4, an initial application of biguanide of approximately 50 ppm was made to a simulated pool, and the biguanide concentration was monitored, with only one adjusting application of biguanide. Bisulfate was added periodically to adjust pH, and at day 25, 1.855 grams of biguanide was added to prevent further falloff in biguanide concentration. No adjustments were required for alkalinity, or hardness. The water clarity as expressed by turbidity was good, as were the flow rate.

In Table 5, the following initial applications were used: approximately 50 ppm biguanide, and approximately 9 ppm sodium persulfate were added. Additional amounts of each were added to provide at least a threshold level of the respective chemicals. Only two bisulfate additions were required for pH adjustment. Water clarity and flow rates through the filter were good. No adjustments were required for alkalinity or hardness.

In Table 6, the following initial applications were used: 50 ppm biguanide, and 9 ppm sodium persulfate.

In Table 7, the following intitial applications were used: 50 ppm biguanide and 30 ppm hydrogen peroxide.

In Table 8, the following initial applications were used: 50 ppm biguanide and 4.5 ppm sodium persulfate.

Example 9

Using the apparatus and procedure described in Example 1, a 24 hour study was conducted, to establish the ability of Oxone peroxygen to oxidize a biguanide. At an oxidant application rate of 6 ppm, 4.9 grams sanitizer/70 gallons of water was consumed in 24 hours. Extrapolated to a 60 day time period, this would amount to 300 grams. This example shows that Oxone is too reactive with biguanide to be used in conjunction with biguanide for sanitizing and clarifying water.

Table 9 below uses the data provided in tables 4–8 together with the data from Example 9. This table illustrates that persulfate is substantially more compatible with biguanide than Oxone and similarly as compatible as hydrogen peroxide. The left hand column, labeled Tbl provides the Table number from which the data was taken.

TABLE 9

| | Biguanide Consumption | | |
|---|---|---|---|
| Tbl | Oxidant | Oxidant Application rate | Biguanide(g) (60 day) |
| 4 | none | — | 1.9 |
| 7 | $H_2O_2$(27.5%) | 9.2 lbs/mo. | 9.5 |
| — | Oxone | 1.0 lbs/24 hour | 4.9[1] |
| 8 | $Na_2S_2O_8$ | 0.38/lb/Month | 12.4 |
| 6 | $Na_2S_2O_8$ | 0.75 lb/3 weeks | 13.6 |
| 5 | $Na_2S_2O_8$ | 0.75 lb/week | 31.0 |

[1]This 24 hour test corresponds to a 300 gram consumption of biguanide when extrapolated to 60 days.

Example 10

In Table 10 below the relative oxidant efficiency of hydrogen peroxide and sodium persulfate is presented at different application rates. Clear Advantage®peroxygen, containing 0.75 weight percent sodium persulfate was used for some of the studies. Clear Advantage is a registered trademark of the FMC corporation. A 27.5% aqueous hydrogen peroxide was used for the studies presented herein.

Table 10 illustrates that persulfate is much more efficient in its use of active oxygen than hydrogen peroxide. The data used herein is derived from tables 5–8. The column marked "Table" indicates the Table from which the data was taken.

TABLE 10

| | Oxidant Efficiency | | | |
|---|---|---|---|---|
| Oxidant | Dosage lb/mo | Oxidant AO % | Oxidant AO(lb) | Table |
| $H_2O_2$(27.5%) | 9.2 | 13 | 1.20 | 7 |
| ClearAdvantage | 4 | 5 | 0.20 | 5 |
| Clear Advantage | 0.5 | 5 | 0.025 | 8 |
| $Na_2S_2O_8$ | 3 | 6.6 | 0.20 | 5 |
| $Na_2S_2O_8$ | 0.375 | 6.6 | 0.025 | 8 |

Example 11

The information used in Table 11 below, is based on the data found in Tables 4–7. Table 11 illustrates that pH adjustment requirements are lowest when sodium persulfate is used. Thus the use of persulfate as the water clarity agent can reduce the use of pH control chemicals. The column marked "Tbl" indicates the Table from which the data was taken.

TABLE 11 pH Control with Bisulfate

| TBL | NaHSO$_4$ (g)[1] | Average pH[2] | Oxidant | Oxidant Application Rate |
|---|---|---|---|---|
| 4 | 18.7 | 7.71 | none | — |
| 7 | 26.2 | 7.73 | H$_2$O$_2$(27.5%) | 9.2 lb/mo |
| 5 | 9.92 | 7.66 | Na$_2$S$_2$O$_8$ | 0.75 lb/week |
| 6 | 9.92 | 7.73 | Na$_2$S$_2$O$_8$ | 0.75 lb/3 weeks |

[1]Sodium Bisulfate use is over a 60 day time frame
[2]Average pH is an average of pH measurement of the 60 day time frame. 41 measurements were averaged.

Example 12

Evaluation of Flow Rate

The information provided in Table 12 below is based on the data found in Tables 4–8. Table 12 illustrates that flow rates are consistently better when persulfate is used than when hydrogen peroxide is used. Although it is not certain why this phenomenon occurs it is important because either too much oxidation or too little oxidation can result in pool cloudiness which is undesirable. Perhaps this is due to the unique oxidizing capability of the persulfate. Thus, the mere fact that flow rates are improved when using persulfate, does not by itself establish efficacy as a water clarity agent. For that, it is also important to actually provide acceptable water clarity. The column marked "Tbl" indicates the table from which the data was taken.

TABLE 12

| Tbl. | Oxidant | Oxidant | Flow Adjust | Avg $f_i$ | Avg $f_{ai}$ | ($f_{ai} - f_i$) |
|---|---|---|---|---|---|---|
| 4 | None | — | 8 | 668 | 898 | 230 |
| 7 | H$_2$O$_2$ | 9.2 lb/mo | 19 | 470 | 833 | 363 |
| 5 | Na$_2$S$_2$O$_8$ | 0.75 lb/wk | 16 | 559 | 867 | 308 |
| 6 | Na$_2$S$_2$O$_8$ | 0.75 lb/3 wk | 8 | 700 | 904 | 204 |

Note: 27.5% hydrogen peroxide was used.

TABLE 4

Biguanide - Sodium Persulfate Compatibility Study
Biguanide Only

| Day | Date | Biguanide[1] (ppm) | Addition (grams) | Sodium Persulfate (ppm S$_2$O$_8$) | Addition (grams) | H$_2$O$_2$ (27.5%) (ppm H$_2$O$_2$) | Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 1 | 12/15 | 48 | | | | | | 7.80 | | 110 | -0.04 | 220 | 9.5 | 520 | 830 |
| | 12/15 (1 HR) | 50 | | | | | | 7.76 | | | | | | | |
| 1 | 12/16 | 48 | | | | | | 7.87 | | | | | | | 845 |
| 2 | 12/17 | 48 | | | | | | 7.90 | | 110 | -0.02 | | | | |
| 3 | 12/18 | 48 | | | | | | >8.00 | 8.0 | | -0.01 | | | | 745 |
| 4 | 12/21 | 48 | | | | | | 7.43 | | | -0.01 | | | | |
| 7 | 12/22 | 48 | | | | | | 7.62 | | 100 | | | | | (720) 890 |
| 8 | 12/23 | 46 | | | | | | 7.63 | | | -0.06 | | | | 800 |
| 9 | 12/28 | 45 | | | | | | 7.74 | | 100 | | | | | |
| 14 | 12/29 | 44 | | | | | | >8.00 | 3.56 | | -0.03 | | | | |
| 15 | 12/30 | 42 | | | | | | 7.59 | | 90 | | | | | (770) 965 |
| 16 | 1993 | | | | | | | | | | | | | | |
| 22* | 1/5 | 45 | | | | | | 7.77 | | 90 | 9.8 | 900 | | | (575) 875 |
| 23 | 1/6 | 42 | | | | | | 7.79 | | | -0.01 | 210 | | 560 | |
| 24 | 1/7 | 43 | 1.855 | | | | | 7.74 | | 90 | | | | | 850 |
| 25 | 1/8 | 43 | | | | | | 7.62 | | | -0.02 | | | | 790 |
| 28 | 1/11 | 46 | | | | | | 7.51 | | 90 | | | | | |
| 29 | 1/12 | 46 | | | | | | 7.65 | | | -0.02 | | | | |
| 30 | 1/13 | 45 | | | | | | 7.63 | | | | | | | |
| 31 | 1/14 | 46 | | | | | | 7.73 | | 90 | -0.03 | | | 560 | (755) 950 |
| 32 | 1/15 | 46 | | | | | | 7.90 | | | | | | | 820 |
| 35 | 1/18 | 47 | | | | | | 7.52 | 3.56 | 95 | -0.01 | | | 560 | |
| 36 | 1/19 | 46 | | | | | | 7.63 | | | | | 9.8 | | |
| 37 | 1/20 | 44 | | | | | | 7.59 | | | | 200 | | | |
| 38 | 1/21 | 46 | | | | | | 7.65 | | 90 | -0.01 | | | | |
| 39 | 1/22 | 42 | | | | | | 7.70 | | | | | | 570 | (700) 990 |
| 42 | 1/25 | 46 | | | | | | 7.64 | | 90 | -0.04 | | | | 965 |
| 43 | 1/26 | 46 | | | | | | 7.90 | | | | | | | |
| 44 | 1/27 | 44 | | | | | | 7.58 | | | | | | | |
| 45 | 1/28 | 43 | | | | | | 7.66 | | 90 | | | | 570 | 880 |
| 46 | 1/29 | 45 | | | | | | 7.58 | | 90 | | | | 560 | 810 |
| 49 | 2/1 | 42 | | | | | | 7.63 | | | -0.04 | | 6.5 | | (370) 800 |
| 50* | 2/2 | 42 | | | | | | 7.67 | | | | | | | |
| 51 | 2/3 | 45 | | | | | | 7.87 | | | | | | | |
| 52 | 2/4 | 41 | | | | | | 7.54 | | | | | | | |
| 53 | 2/5 | 42 | | | | | | 7.59 | | 90 | | | | 560 | (730) 880 |
| 56 | 2/8 | 43 | | | | | | 7.90 | | 90 | | 220 | | 560 | 840 |
| 57 | 2/9 | 41 | | | | | | 7.97 | 3.56 | | | | | | |
| 58 | 2/10 | 40 | | | | | | 7.66 | | | | | | | |

TABLE 4-continued

Biguanide - Sodium Persulfate Compatibility Study
Biguanide Only

| Day | Date | Biguanide[1] Addition (ppm) | Biguanide[1] Addition (grams) | Sodium Persulfate (ppm $S_2O_8$) | Sodium Persulfate Addition (grams) | $H_2O_2$ (27.5%) (ppm $H_2O_2$) | $H_2O_2$ (27.5%) Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 59 | 2/11 | 43 | | | | | | 7.59 | | 90 | −0.03 | | | | 820 |
| 60 | 2/12 | 42 | | | | | | 7.60 | | 90 | | | | 540 | (720) 830 |
| 64* | 2/16 | 41 | | | | | | 7.78 | | | | | | | |

*tank stirred
[+]flow numbers in parenthesis represent initial, uncorrected flow rate on day of test
[1]ideal range: Biguanide - 30–50 ppm, pH - 7.2–8.0, Alkalinity - 100–150 ppm, Calcium - 175–250 ppm, TDS - <1000, Flow - 740–1000 mL/min
[2]maximum pH reading on Lovibond PC 20 Photometer is 8.0
Biguanide added as a 20% solution
Experiment conducted in 70 gallon simulated pool

TABLE 5

Biguanide - Sodium Persulfate Compatibility Study
Biguanide with Sodium Persulfate @ 0.75 lb/10K gal/week

| Day | Date | Biguanide[1] (ppm) | Biguanide Addition (grams) | Sodium Persulfate (ppm $S_2O_8$) | Sodium Persulfate Addition (grams) | $H_2O_2$ (27.5%) (ppm $H_2O_2$) | $H_2O_2$ Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow+[1] (mL/min) |
|---|---|---|---|---|---|---|---|---|---|---|---|---|---|---|---|
| 1 | 12/15 | 48 | | | 2.38 | | | 7.46 | | 100 | 0.01 | 200 | 7.6 | 520 | 840 |
| | 12/15 (1 HR) | | | >7 | | | | 7.65 | | | | | | | |
| 1 | 12/16 | 44 | | 7 | | | | 7.53 | | | | | | | |
| 2 | 12/17 | 46 | | 7 | | | | 7.51 | | 100 | −0.01 | | | | (170) 800 |
| 3 | 12/18 | 44 | | 7 | | | | 7.73 | | | −0.03 | | | | |
| 4 | 12/21 | 39 | | 5.6 | | | | 7.77 | | | −0.02 | | | | (450) 880 |
| 7 | 12/22 | 36 | 3.18 | 4.2 | | | | 7.55 | | 100 | | | | | |
| 8 | 12/23 | 41 | | >14 | 2.38 | | | 7.74 | | | −0.11 | | | | (625) 890 |
| 9 | 12/28 | 37 | | <14 | | | | 7.74 | | 100 | | | | | (480) 890 |
| 14 | 12/29 | 32 | 4.6 | <14 | 2.38 | | | 8.00 | 3.56 | | −0.03 | | | | |
| 15 | 12/30 | 29 | | <21 | | | | 7.43 | | 95 | | | | | (600) 865 |
| 16 | | 36 | | | | | | | | | | | | | |
| | 1993 | | | | | | | | | | | | | | |
| 22* | 1/5 | 32 | | >14 | 2.38 | | | 7.64 | | 90 | −0.04 | 210 | 12.2 | (510) 840 | (470) 850 |
| 23 | 1/6 | 30 | | <28 | | | | 7.55 | | 95 | | | | | |
| 24 | 1/7 | 31 | | >21 | | | | 7.64 | | 100 | −0.01 | | | | (640) 840 |
| 25 | 1/8 | 29 | 5.565 | <28 | | | | 7.7 | | 100 | | | 610 | (610) 785 | |
| 28 | 1/11 | 32 | | 21 | 2.38 | | | 7.54 | | | −0.01 | | | | |
| 29 | 1/12 | 32 | | 21 | | | | 7.7 | | | | | | | |
| 30 | 1/13 | 32 | | >28 | | | | 7.54 | | 90 | −0.01 | | | | (670) 930 |
| 31 | 1/14 | 31 | | 28 | | | | 7.62 | | | | | 11.0 | 600 | |
| 32 | 1/15 | 28 | 5.83 | 28 | | | | 7.73 | | 90 | | | | 600 | 780 |
| 35 | 1/18 | 33 | | 28 | | | | 7.66 | | | | | | | |
| 36 | 1/19 | 32 | | >28 | discontinued | | | 7.87 | | | | | | | |
| 37 | 1/20 | 31 | | 28 | | | | 7.50 | | 90 | | | | | |
| 38 | 1/21 | 30 | | 28 | | | | 7.71 | | | −0.03 | | | | (680) 920 |
| 39 | 1/22 | 32 | | 28 | | | | 7.72 | | 90 | | | 210 | 600 | 830 |
| 42 | 1/25 | 30 | | 28 | | | | 7.79 | | | −0.05 | | | | |
| 43 | 1/26 | 27 | 6.625 | 28 | | | | 7.61 | | | | | | | |
| 44 | 1/27 | 38 | | 28 | | | | 7.66 | | | | | 8.8 | 610 | 760 |
| 45 | 1/28 | 36 | | 21 | | | | 8.00 | 6.36 | 80 | | | | | (710) 910 |
| 46 | 1/29 | 34 | 6.625 | 21 | | | | 7.29 | | 80 | −0.07 | | | 600 | (340) 870 |
| 49 | 2/1 | 29 | | 21 | | | | 7.49 | | | | | | | |
| 50* | 2/2 | 38 | | 21 | | | | 7.50 | | | | | | | |
| 51 | 2/3 | 39 | | 21 | | | | 7.60 | | | | | | | |
| 52 | 2/4 | 40 | | 21 | | | | 7.56 | | | | | 220 | | |
| 53 | 2/5 | 39 | | 21 | | | | 7.49 | | 80 | | | | 610 | 760 |
| 56 | 2/8 | 37 | | 21 | | | | 7.81 | | 80 | | | | 610 | (750) 820 |
| 57 | 2/9 | 37 | | 21 | | | | 7.72 | | | | | | | |
| 58 | 2/10 | 34 | | 21 | | | | 7.71 | | | | | | | |

TABLE 5-continued

Biguanide - Sodium Persulfate Compatibility Study
Biguanide with Sodium Persulfate @ 0.75 lb/10K gal/week

| | Biguanide[1] | | Sodium Persulfate | | H$_2$O$_2$ (27.5%) | | | Bisulfate | Alkalinity[1] | Turbidity[1] | Calcium[1] | TOC | TDS[1] | Flow[+1] |
|---|---|---|---|---|---|---|---|---|---|---|---|---|---|---|
| Day | Date | (ppm) | Addition (grams) | (ppm S$_2$O$_8$) | Addition (grams) | (ppm H$_2$O$_2$) | Addition (mL) | pH[1] | Addition (grams) | (ppm) | (NTU) | (ppm) | (ppm C) | (ppm) | (mL/min) |
| 59 | 2/11 | 36 | | 21 | | | | 7.71 | | 80 | −0.02 | | | | (680) 900 |
| 60 | 2/12 | 36 | | 21 | | | | 7.73 | | 80 | | | | | |
| 64* | 2/16 | 34 | | 14 | | | | 7.88 | | | | | | 580 | (560) 885 |

*tank stirred
+flow numbers in parenthesis represent initial, uncorrected flow rate on day of test
[1]ideal range: Biguanide - 30–50 ppm, pH - 7.2–8.0, Alkalinity - 100–150 ppm, Calcium - 175–250 ppm, TDS - <1000, Flow - 740–1000 mL/min
[2]maximum pH reading on Lovibond PC 20 Photometer is 8.0
Biguanide added as a 20% solution
Experiment conducted in 70 gallon simulated pool

TABLE 6

Biguanide - Sodium Persulfate Compatibility Study
Biguanide with Sodium Persulfate @ 0.75 lb/10K gal/3 weeks

| Day | Date | Biguanide[1] | | Sodium Persulfate | | | $H_2O_2$ (27.5%) | | pH[1] | Bisulfate | Alkalinity[1] | Turbidity | Calcium[1] | TOC | TDS[1] | Flow[+1] |
|---|---|---|---|---|---|---|---|---|---|---|---|---|---|---|---|---|
| | | (ppm) | Addition (grams) | (ppm $S_2O_8$) | Addition (grams) | | (ppm $H_2O_2$) | Addition (mL) | | Addition (grams) | (ppm) | (NTU) | (ppm) | (ppm C) | (ppm) | (mL/min) |
| 1 | 12/15 | 51 | | | 2.38 | | | | 7.69 | | 100 | -0.03 | 210 | 7.2 | 460 | 780 |
| | 12/15 (1 HR) | 51 | | 7 | | | | | 7.87 | | | | | | | |
| 1 | 12/16 | 46 | | 7 | | | | | 7.76 | | | -0.02 | | | | (740) 810 |
| 2 | 12/17 | 41 | | 7 | | | | | 7.74 | | 110 | -0.01 | | | | |
| 3 | 12/18 | 41 | | 7 | | | | | 7.74 | | | -0.03 | | | | |
| 4 | 12/21 | 41 | | 7 | | | | | 7.80 | | | | | | | 800 |
| 7 | 12/22 | 38 | 3.18 | 5.6 | | | | | 7.66 | | 100 | | | | | |
| 8 | 12/23 | 41 | | 4.2 | | | | | 7.72 | | | | | | | 790 |
| 9 | 12/28 | 40 | | 4.2 | | | | | 7.80 | | 100 | -0.03 | | | | (700) 875 |
| 14 | 12/29 | 37 | 4.6 | 2.8 | | | | | >8.00 | 3.56 | | -0.05 | | | | |
| 15 | 12/30 | 36 | | 2.8 | | | | | 7.58 | | 90 | | | | | (690) 900 |
| 16 | 1993 | 42 | | 2.8 | | | | | | | | | | | | |
| 22* | 1/5 | 42 | | 2.1 | 2.38 | | | | 7.82 | | 90 | -0.02 | 220 | 10.1 | | 870 |
| 23 | 1/6 | 40 | | 14 | | | | | 7.60 | | 90 | -0.01 | | | | (610) 905 |
| 24 | 1/7 | 38 | | <14 | | | | | 7.72 | | | | | | | |
| 25 | 1/8 | 40 | 2.65 | 14 | | | | | 7.84 | | 90 | 0.0 | | | 550 | 915 |
| 28 | 1/11 | 37 | | >7 | | | | | 7.72 | | | | | | | 790 |
| 29 | 1/12 | 39 | | >7 | | | | | 7.66 | | | | | | | |
| 30 | 1/13 | 39 | | >7 | | | | | 7.71 | | | | | | | |
| 31 | 1/14 | 39 | 3.18 | >7 | | | | | 7.79 | | 90 | -0.03 | | | 530 | 795 |
| 32 | 1/15 | 38 | | >7 | | | | | 7.71 | | | | | | | |
| 35 | 1/18 | 39 | | <7 | | | | | 7.92 | | 90 | -0.02 | | | 540 | (750) 990 |
| 36 | 1/19 | 40 | | >5.6 | | | | | 7.73 | | | | | | | |
| 37 | 1/20 | 39 | | <5.6 | | | | | 7.77 | | 90 | -0.02 | | | | |
| 38 | 1/21 | 38 | | 5.6 | | | | | 7.76 | | | | | | | 900 |
| 39 | 1/22 | 39 | | 5.6 | | | | | 7.71 | | 90 | -0.05 | 220 | 11.7 | 540 | 895 |
| 42 | 1/25 | 38 | | 5.6 | | | | | 7.82 | 6.36 | | | | | | |
| 43 | 1/26 | 35 | | 5.6 | discontinued | | | | 7.98 | | | | | | | |
| 44 | 1/27 | 36 | | 4.2 | | | | | 7.40 | | 80 | | | | 560 | 830 |
| 45 | 1/28 | 36 | | 5.6 | | | | | 7.40 | | 80 | -0.04 | | 7.7 | | (670) 915 |
| 46 | 1/29 | 35 | | 5.6 | | | | | 7.54 | | | | | | 540 | 850 |
| 49 | 2/1 | 36 | | 5.6 | | | | | 7.60 | | | | | | | |
| 50* | 2/2 | 37 | | 4.2 | | | | | 7.52 | | | | | | | |
| 51 | 2/3 | 38 | | 4.2 | | | | | 7.46 | | 80 | | | | | |
| 52 | 2/4 | 35 | | 4.2 | | | | | 7.49 | | 80 | | | | 550 | (690) 940 |
| 53 | 2/5 | 37 | | 4.2 | 1.19 | | | | 7.92 | | | | 210 | | 550 | 880 |
| 56 | 2/8 | 33 | | 4.2 | | | | | 7.85 | | | | | | | |
| 57 | 2/9 | 36 | | >7 | | | | | 7.76 | | | | | | | |
| 58 | 2/10 | 34 | | | | | | | | | | | | | | |

TABLE 6-continued

Biguanide - Sodium Persulfate Compatibility Study
Biguanide with Sodium Persulfate @ 0.75 lb/10K gal/3 weeks

| | | Biguanide[1] | | Sodium Persulfate | | $H_2O_2$ (27.5%) | | | Bisulfate | Alkalinity[1] | Turbidity[1] | Calcium[1] | TOC | TDS[1] | Flow[+1] |
|---|---|---|---|---|---|---|---|---|---|---|---|---|---|---|---|
| Day | Date | (ppm) | Addition (grams) | (ppm $S_2O_8$) | Addition (grams) | (ppm $H_2O_2$) | Addition (mL) | pH[1] | Addition (grams) | (ppm) | (NTU) | (ppm) | (ppm C) | (ppm) | (mL/min) |
| 59 | 2/11 | 35 | | >7 | | | | 7.87 | | 80 | −0.02 | | | | 860 |
| 60 | 2/12 | 34 | | >7 | | | | 7.90 | | 80 | | | | | |
| 64 | 2/16 | 32 | | >7 | | | | 7.92 | | | | | | 530 | (755) 900 |

*tank stirred
+flow numbers in parenthesis represent initial, uncorrected flow rate on day of test
[1]ideal range: Biguanide - 30–50 ppm, pH - 7.2–8.0, Alkalinity - 100–150 ppm, Calcium - 175–250 ppm, TDS - <1000, Flow - 740–1000 mL/min
[2]maximum pH reading on Lovibond PC 20 Photometer is 8.0
Biguanide added as a 20% solution
Experiment conducted in 70 gallon simulated pool

TABLE 7

Biguanide - Sodium Persulfate Compatibility Study
Biguanide with 27.5% H$_2$O$_2$ @ 1 gal/10K gal/mo

| Day | Date | Biguanide[1] (ppm) | Addition (grams) | Sodium Persulfate (ppm S$_2$O$_8$) | Addition (grams) | H$_2$O$_2$ (27.5%) (ppm H$_2$O$_2$) | Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 1 | 12/15 | 48 | | | | | 26.5 | 7.87 | | 120 | −0.04 | 190 | 9.1 | 510 | 775 |
| | 12/15 (1 HR) | 48 | | | | >30 | | 7.84 | | | | | | | |
| 1 | 12/16 | 48 | | | | 30 | | 7.80 | | | | | | | |
| 2 | 12/17 | 43 | | | | 30 | | 7.74 | | | 0.08 | | | | (300) 845 |
| 3 | 12/18 | 42 | | | | 30 | | 7.84 | | 125 | −0.01 | | | | (210) 860 |
| 4 | 12/21 | 39 | 3.18 | | | 25 | | 7.98 | | | −0.02 | | | | |
| 7 | 12/22 | 46 | | | | 25 | | 7.49 | 6.36 | 110 | | | | | (600) 910 |
| 8 | 12/23 | 46 | | | | 25 | | 7.70 | | 110 | −0.08 | | | | (330) 835 |
| 14 | 12/28 | 41 | | | | 20 | | 7.84 | | 110 | −0.08 | | | | |
| 15 | 12/29 | 38 | | | | 20 | | >8.00 | 6.36 | 100 | | | | | (710) 890 |
| 16 | 12/30 | 41 | | | | 20 | | 7.63 | | | | | | | |
| | 1993 | | | | | | | | | | | | | | |
| 22* | 1/5 | 40 | | | | 15 | | 7.80 | | 110 | −0.02 | 190 | 11.9 | | (270) 815 |
| 23 | 1/6 | 37 | | | | 15 | | 7.91 | | 110 | | | | | (400) 640 |
| 24 | 1/7 | 37 | | | | 15 | | 7.74 | | 110 | −0.02 | | | | (660) 840 |
| 25 | 1/8 | 37 | 3.445 | | | 15 | | 7.87 | | | | | | 580 | (680) 980 |
| 28 | 1/11 | 42 | | | | 12.5 | | 7.80 | | | 0.0 | | | | |
| 29 | 1/12 | 42 | | | | 10 | 26.5 | 7.76 | | | | | | | |
| 30 | 1/13 | 41 | | | | 50 | | 7.52 | | | | | | | |
| 31 | 1/14 | 40 | | | | 45 | | 7.95 | | 100 | −0.04 | | 11.0 | 560 | (580) 965 |
| 32 | 1/15 | 39 | 2.92 | | | 40 | | 7.82 | | 90 | −0.00 | | | 560 | (540) 960 |
| 35 | 1/18 | 43 | | | | 30 | | 7.66 | 3.56 | | | | | | |
| 36 | 1/19 | 40 | | | | 30 | | 7.55 | | | | | | | |
| 37 | 1/20 | 40 | | | | 25 | | 7.59 | | 95 | −0.03 | | | 570 | (660) 820 |
| 38 | 1/21 | 44 | | | | 25 | | 7.70 | | 95 | −0.05 | 200 | | | (600) 950 |
| 39 | 1/22 | 39 | | | | 25 | | 7.58 | | | | | | | |
| 42 | 1/25 | 40 | | | | 17.5 | | 7.84 | 6.36 | | | | | | |
| 43 | 1/26 | 40 | | | | 17.5 | | 7.65 | | | | | | 590 | |
| 44 | 1/27 | 40 | | | | 17.5 | | 8.00 | | 90 | −0.03 | | 7.0 | 570 | (760) 830 |
| 45 | 1/28 | 38 | | | | 15 | | 7.38 | | 90 | | | | | 800 |
| 46 | 1/29 | 39 | | | | 15 | | 7.35 | | | | | | | (270) 965 |
| 49 | 2/1 | 40 | | | | 15 | | 7.63 | | | | | | | |
| 50* | 2/2 | 38 | | | | 12.5 | | 7.67 | | | | | | | |
| 51 | 2/3 | 38 | | | | 12.5 | | 7.62 | | 90 | | 210 | | 580 | (515) 855 |
| 52 | 2/4 | 38 | | | | 10 | | 7.67 | | 85 | | | | 570 | (460) 950 |
| 53 | 2/5 | 39 | | | | 10 | | 7.56 | | | | | | | |
| 56 | 2/8 | 37 | | | | 7.5 | | 7.91 | | | | | | | |
| 57 | 2/9 | 39 | | | | 5 | 26.5 | 7.97 | 3.56 | | | | | | |
| 58 | 2/10 | 37 | | | | 35 | | 7.61 | | | | | | | |

TABLE 7-continued

Biguanide - Sodium Persulfate Compaibility Study
Biguanide with 27.5% $H_2O_2$ @ 1 gal/10K gal/mo

| Day | Date | Biguanide[1] Addition (grams) | (ppm) | Sodium Persulfate (ppm $S_2O_8$) | Addition (grams) | $H_2O_2$ (27.5%) (ppm $H_2O_2$) | Addition (mL) | pH[1] | Bisulfate Addition (grams) | Alkalinity[1] (ppm) | Turbidity[1] (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 59 | 2/11 | | 36 | | | 35 | | 7.65 | | | | | | | |
| 60 | 2/12 | | 36 | | | 35 | | 7.73 | | 90 | −0.04 | | | | (330) 840 |
| 64* | 2/16 | | 36 | | | 35 | | 7.80 | | 90 | | | | 560 | (50) 830 |

*tank stirred
+flow numbers in parenthesis represent initial, uncorrected flow rate on day of test
[1]ideal range: Biguanide - 30–50 ppm, pH - 7.2–8.0, Alkalinity - 100–150 ppm, Calcium - 175–250 ppm, TDS - <1000, Flow - 740–1000 mL/min
[2]maximum pH reading on Lovibond PC 20 Photometer is 8.0
Biguanide added as a 20% solution
Experiment conducted in 70 gallon simulated pool

TABLE 8

Biguanide - Sodium Persulfate Compatibility Study
Biguanide with Sodium Persulfate @ 0.38 lb/10,000 gallons every 4 weeks

| Day | Date | Biguanide[1] (ppm) | Biguanide Addition (grams) | Sodium Persulfate (ppm $S_2O_8$) | Sodium Persulfate Addition (grams) | $H_2O_2$ (27.5%) (ppm $H_2O_2$) | $H_2O_2$ Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 1 | 2/12 | 34 | | >7 | | | | 7.90 | | | | | | | |
| 5* | 2/16 | 32 | | >7 | | | | 7.92 | | 80 | | | 9.0 | 530 | (755) 900 |
| 6 | 2/17 | 32 | | 7 | | | | 7.83 | | | | | | | |
| 7 | 2/18 | 32 | | 7 | | | | 7.82 | | | -0.02 | | | | |
| 8 | 2/19 | 33 | | 7 | | | | 7.92 | | 80 | | | | 530 | 960 |
| 11 | 2/22 | 33 | | 7 | | | | 7.85 | | | | | | | 910 |
| 12 | 2/23 | 32 | | <7 | | | | 7.79 | | 80 | | | | | |
| 13 | 2/24 | 32 | | 7 | | | | 7.87 | | | | 200 | 530 | | |
| 14 | 2/25 | 31 | | 7 | | | | 7.90 | | 80 | -0.02 | | | | 880 |
| 15 | 2/26 | 32 | | 7 | | | | 7.79 | | | | | | | 890 |
| 17 | 3/1 | 32 | | <7 | | | | 7.74 | | | | | | 540 | |
| 18 | 3/2 | 29 | 12.37 | 7 | | | | 7.80 | | 80 | -0.01 | | 13.9 | | 880 |
| 19* | 3/3 | 47 | | <7 | | | | 7.85 | | | | | | | 820 |
| 20 | 3/4 | 48 | | 5.6 | | | | 7.82 | | 70 | | | | 540 | 815 |
| 23 | 3/8 | 44 | | 5.6 | | | | 7.87 | | | | | | 550 | |
| 24 | 3/9 | 44 | | 4.2 | 1.59 | | | 7.91 | | | | | | | |
| 25 | 3/10 | 45 | | >7 | | | | 7.87 | | | -0.08 | 220 | | | 810 |
| 26 | 3/11 | 40 | | >7 | | | | 7.92 | | 70 | | | | | |
| 27 | 3/12 | 41 | | >7 | | | | 7.90 | | 70 | | | | | |
| 31 | 3/16 | 39 | | 7 | | | | 7.87 | | | | | | | |
| 32 | 3/17 | 43 | | 7 | | | | <8.00 | 3.56 | | | | | 560 | |
| 33 | 3/18 | 39 | | 7 | | | | 7.56 | | | | | | | |
| 34 | 3/19 | 39 | | 7 | | | | 7.58 | | | | | | | 810 |
| 37 | 3/22 | 38 | | >7 | | | | 7.80 | 6.36 | 60/160[3] | | | | 560 | (710) 960 |
| 38* | 3/23 | 40 | | 7 | | | | 7.70 | | 140 | | | 17.0 | | |
| 39 | 3/24 | 42 | | 7 | | | | 7.97 | | | -0.04 | | | 650 | (700) 860 |
| 40 | 3/25 | 40 | | >7 | | | | <8.00 | 3.56 | 140 | | | | | 880 |
| 41 | 3/26 | 42 | | >7 | | | | 7.66 | | 150 | | | | | 870 |
| 44 | 3/29 | 41 | | 7 | | | | 7.95 | | | | | 20.8 | | |
| 45* | 3/30 | 40 | | <5.6 | | | | <8.00 | 6.36 | 125 | | 240 | | | |
| 46 | 3/31 | 38 | | 5.6 | | | | 7.58 | | 135 | | | | | (580) 870 |
| 51 | 14/5 | 39 | | >5.6 | | | | <8.00 | 6.36 | 120 | | | | | 910 |
| 52* | 4/6 | 40 | | 5.6 | 1.59 | | | 7.63 | | | +0.04 | | 18.5 | | 870 |
| 53 | 4/7 | 36 | | >14 | | | | 7.73 | | 120 | | | | 690 | 850 |
| 54 | 4/8 | 37 | | <7 | | | | 7.74 | | | | | | | |
| 55 | 4/9 | 38 | | <7 | | | | 7.74 | | | | | | | |

TABLE 8-continued

Biguanide - Sodium Persulfate Compatibility Study
Biguanide with Sodium Persulfate @ 0.38 lb/10,000 gallons every 4 weeks

| Day | Date | Biguanide[1] (ppm) | Addition (grams) | Sodium Persulfate (ppm $S_2O_8$) | Addition (grams) | $H_2O_2$ (27.5%) (ppm $H_2O_2$) | Addition (mL) | pH[1] | Bisulfate Addition (grams) | Alkalinity[1] (ppm) | Turbidity (NTU) | Calcium[1] (ppm) | TOC (ppm C) | TDS[1] (ppm) | Flow[+1] (mL/min) |
|---|---|---|---|---|---|---|---|---|---|---|---|---|---|---|---|
| 58 | 4/12 | 36 | | <7 | | | | 7.98 | 6.36 | 130 | | | | | 840 |
| 59* | 4/13 | 35 | | <7 | | | | 7.52 | | 110 | | | | | (510) 920 |
| 60 | 4/14 | 35 | | <7 | | | | 7.65 | | | | | | 690 | |

*tank stirred
+flow numbers in parenthesis represent initial, uncorrected flow rate on day of test
[1]ideal range: Biguanide - 30–50 ppm, pH - 7.2–8.0, Alkalinity - 100–150 ppm, Calcium - 175–250 ppm, TDS - <1000, Flow - 740–1000 mL/min
[2]maximum pH reading on Lovibond PC 20 Photometer is 8.0
Biguanide added as a 20% solution
Experiment conducted in 70 gallon simulated pool

We claim:

1. A method of treating water, comprising
introducing a chelating agent to the water for the purpose of chelating metal cations present in the water;
providing an antichlor;
adding an effective amount of biguanide sanitizer;
applying an effective amount of a salt containing $S_2O_8^=$ oxidizer.

2. The method of claim 1, wherein the effective amount of sanitizer is within the range of 20 to 60 ppm, and
wherein at least 2 ppm of a salt containing $S_2O_8$ is applied to the pool water.

3. A method of treating a recreational water, comprising adding to the water 20 to 60 ppm of a biguanide as a sanitizer, at least 2 ppm of an $S_2O_8$ salt to clarify and to reduce the total organic content of the water, and then adding maintenance dosages of the $S_2O_8$ salt to the pool water at intervals spaced apart for maintaining at least a threshold level of the salt in the water sufficient to maintain water clarity.

4. The method of claim 3, wherein the maintained level of the salt is within the range of 2 to 9 ppm, and the interval is within the range of from one week to two months.

5. The method of claim 3 wherein maintenance dosages of the $S_2O_8$ salt are added at one week intervals.

6. A method of treating water, comprising introducing a chelating agent to the water for the purpose of chelating metal cations present in the water; providing an antichlor; adding an effective amount of biguanide sanitizer; applying an effective amount of a $S_2O_8$ salt to obtain at least a level of the salt in the water sufficient to obtain water clarity, and then adding maintenance dosages of the $S_2O_8$ salt to the pool water at intervals spaced apart for maintaining at least a threshold level of the salt in the water sufficient to maintain water clarity.

7. The method of claim 6, wherein the effective amount of sanitizer is within the range of 20 to 60 ppm, at least two ppm of the $S_2O_8$ salt is added to the water, not as an algaecide, but to obtain water clarity, and the maintenance dosages of the salt are added at intervals within the range of from one week to two months.

8. The method of claim 7, wherein the maintenance dosages of the salt are added at one week intervals.

* * * * *